US 8,170,986 B2
May 1, 2012

(12) United States Patent
Wakazono

(10) Patent No.: US 8,170,986 B2
(45) Date of Patent: May 1, 2012

(54) INFORMATION PROCESSING DEVICE

(75) Inventor: Tomomi Wakazono, Ogaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 345 days.

(21) Appl. No.: 12/010,467

(22) Filed: Jan. 25, 2008

(65) Prior Publication Data

US 2008/0183729 A1     Jul. 31, 2008

(30) Foreign Application Priority Data

Jan. 25, 2007 (JP) ................................ 2007-014606

(51) Int. Cl.
*G06F 17/00* (2006.01)
(52) U.S. Cl. ........ 707/610; 707/609; 707/611; 707/621; 707/E17.009
(58) Field of Classification Search ............... 707/104.1, 707/609, 610, 611, E17.009, 621; 709/219, 709/248
See application file for complete search history.

(56) References Cited

U.S. PATENT DOCUMENTS

| | | | | |
|---|---|---|---|---|
| 7,949,634 B2* | 5/2011 | Freedman | .................... | 707/620 |
| 7,966,362 B2* | 6/2011 | Neumann et al. | ............. | 709/201 |
| 2002/0026459 A1* | 2/2002 | Fernandez | .................... | 707/506 |
| 2002/0123336 A1* | 9/2002 | Kamada | ......................... | 455/420 |
| 2004/0054670 A1* | 3/2004 | Noff et al. | .......................... | 707/3 |
| 2004/0143652 A1* | 7/2004 | Grannan et al. | ............. | 709/223 |
| 2004/0156487 A1* | 8/2004 | Ushiki et al. | ............... | 379/88.22 |
| 2004/0268451 A1* | 12/2004 | Robbin et al. | ......... | 999/999.999 |
| 2005/0240494 A1* | 10/2005 | Cue et al. | ........................ | 705/27 |
| 2006/0168340 A1* | 7/2006 | Heller et al. | .................. | 709/242 |
| 2006/0195902 A1* | 8/2006 | King et al. | ....................... | 726/21 |
| 2006/0259930 A1* | 11/2006 | Rothschild | ...................... | 725/80 |
| 2006/0265409 A1* | 11/2006 | Neumann et al. | ............. | 707/100 |
| 2007/0031116 A1* | 2/2007 | Takatsuka et al. | ............... | 386/95 |

(Continued)

FOREIGN PATENT DOCUMENTS

| | | |
|---|---|---|
| JP | 2004234122 A | 8/2004 |
| JP | 2006196008 A | 7/2006 |

OTHER PUBLICATIONS iPod Tutorial (online), Apple Computers, Inc. <http//www.apple.com/jp/support/ipod/tutorial/ip_gettingstarted_tl.html>, downloaded Nov. 28, 2006. Concise statement of relevance provided herewith. Notification of Reasons for Rejection for Japanese patent application No. 2007-014606 mailed Jul. 5, 2011.

*Primary Examiner* — Rehana Perveen
*Assistant Examiner* — Tiffany Thuy Bui
(74) *Attorney, Agent, or Firm* — Banner & Witcoff, Ltd.

(57) ABSTRACT

An information processing device may be connected with an external memory and may be provided with a contents data storage device, an obtaining device, and an outputting device. The storage device may store an internet address and contents data downloaded therefrom. The obtaining device may obtain an internet address stored in the external memory. The outputting device may output, when the internet address obtained is identical to the internet address stored in the storage device, the contents data combined with the internet address to the external memory. Furthermore, the information processing device may be provided with an obtaining device, an internet communication device, and an outputting device. The obtaining device may obtain an internet address stored in the external memory. The communication device may download contents data from the obtained internet address. The outputting device may output the contents data downloaded by the internet communication device to the external memory.

11 Claims, 13 Drawing Sheets

U.S. PATENT DOCUMENTS

| | | | |
|---|---|---|---|
| 2007/0049343 A1* | 3/2007 | Fukasawa | 455/558 |
| 2007/0094263 A1* | 4/2007 | Tessman et al. | 707/9 |
| 2007/0136305 A1* | 6/2007 | Kelley et al. | 707/10 |
| 2007/0202865 A1* | 8/2007 | Moride | 455/419 |
| 2008/0046948 A1* | 2/2008 | Verosub | 725/117 |
| 2008/0052704 A1* | 2/2008 | Wysocki | 717/173 |
| 2008/0065691 A1* | 3/2008 | Suitts et al. | 707/104.1 |
| 2008/0086747 A1* | 4/2008 | Rasanen et al. | 725/46 |
| 2008/0183729 A1* | 7/2008 | Wakazono | 707/100 |
| 2008/0188209 A1* | 8/2008 | Dorogusker et al. | 455/414.2 |
| 2009/0019240 A1* | 1/2009 | Kawasaki | 711/154 |
| 2009/0265750 A1* | 10/2009 | Jones et al. | 707/E17.009 |

* cited by examiner

| URL | Format | Expire Date | Status |
|---|---|---|---|
| 110a → http://www.aaaaa.com | MP3 | 2007/1/30 | DL Finished |
| 110b → http://www.bbbbb.com | MIDI | 2007/1/20 | DL Unfinished |
| ⋮ | ⋮ | ⋮ | ⋮ |

(columns: 110, 111, 112, 113)

| URL | Contents Data |
|---|---|
| 110a → http://www.aaaaa.com | ******··· |
| 110b → http://www.bbbbb.com | |
| ⋮ | ⋮ |

(columns: 110, 114)

FIG. 4

| No. | URL |
|---|---|
| 1 | →http://www.aaaaa.com (2007/1/30) |
| 2 | →http://www.ccccc.com |
| ⋮ | ⋮ |

FIG. 5

| Date | Memo |
|---|---|
| ⋮ | ⋮ |
| 2007/1/19 | Download From http://www.bbbbb.com |
| ⋮ | ⋮ |

INFORMATION PROCESSING DEVICE

CROSS-REFERENCE TO RELATED APPLICATION

This application claims priority to Japanese Patent Application No. 2007-014606, filed on Jan. 25, 2007, the contents of which are hereby incorporated by reference into the present application.

BACKGROUND OF THE INVENTION

1. Field of the Invention

The present invention relates to an information processing device that outputs contents data downloaded from the internet to an external memory. Moreover, the term "contents data" utilized in the present specification is not restrictive concerning the type and format of data, but includes any types and formats of data stored on the internet Further, the term "external memory" refers to memory that is configured separately from the information processing device. The "external memory", may equally well be provided with an operational device, or may equally well not be provided with an operational device.

2. Description of the Related Art

Downloading audio data from the internet onto a personal computer (hereafter referred to as PC) is an action that is widely performed. When the PC is connected to a portable audio player, the PC outputs the downloaded audio data to the audio player. The audio data can thus be stored in the audio player. The following is set forth in the homepage (URL. http://www.apple.com/jp/support/ipod/tutorial/ip_getting-started_tl.html) found on Jan. 15, 2007: when the audio player is connected to the PC, the audio data is automatically output to the audio player.

BRIEF SUMMARY OF THE INVENTION

Although the above method is utilized widely, it is not necessarily the best method. In the present specification, a technique is taught for storing contents data in an external memory (the portable audio player in the above example) utilizing a novel technique that differs from the conventional technique.

One technique taught in the present specification is an information processing device to which an external memory is to be connected. The information processing device may comprise a contents data storage device, an obtaining device, and an outputting device. The contents data storage device may store a combination of an internet address and contents data downloaded from the internet address. The term "internet address" refers to an address on the internet storing contents data, and is represented for example by a URL (Uniform Resource Locator). Moreover, the contents data stored by the contents data storage device may equally well be data downloaded from the internet by the information processing device itself, or may equally well be data downloaded by another device and transmitted to the information processing device. The obtaining device may obtain an internet address stored in the external memory. The outputting device may output in a case where the internet address obtained by the obtaining device is identical to the internet address stored in the contents data storage device, the contents data combined with the internet address in the contents data storage device to the external memory. With this configuration, it is possible to store the contents data in the external memory utilizing a novel technique that differs from the conventional technique.

One technique taught in the present specification is an information processing device to which an external memory is to be connected. The information processing device may comprise an obtaining device, an internet communication device, and an outputting device. The obtaining device may obtain an internet address stored in the external memory. The internet communication device may download contents data from the internet address obtained by the obtaining device. The outputting device may output the contents data downloaded by the internet communication device to the external memory. With this configuration, it is possible to store the contents data in the external memory utilizing a novel technique that differs from the conventional technique.

BRIEF DESCRIPTION OF THE DRAWINGS

FIG. 2 shows an example of stored contents of a RAM of a PC.

FIG. 3 shows an example of stored contents of the RAM of the PC.

FIG. 4 shows an example of stored contents of a URL storage part of a portable audio player.

FIG. 5 shows an example of stored contents of a schedule storage part of the portable audio player.

DETAILED DESCRIPTION OF THE PREFERRED EMBODIMENT

An information processing device taught in the present specification has the novel characteristic of obtaining an internet address stored in an external memory. It is consequently possible to realize, for example, the following. The following is merely an example, and the scope of the technique taught in the present specification is not to be interpreted in a narrow sense according to this description. A user of the external memory is capable of storing, in the external memory, an internet address that is storing desired contents data The information processing device obtains the internet address that is being stored in the external memory, and outputs the contents data of that interact address to the external memory. The contents data of internet addresses that are not being stored in the external memory is not output by the information processing device to the external memory. This information processing device is capable of utilizing the internet address that is being stored in the external memory as a key to determine whether to output the contents data to the external memory. It is thus possible to store only contents data desired by the user in the external memory. That is, since the contents data of an internet address that is not being stored in the external memory is not transmitted from the information processing device to the external memory, the contents data stored in the information processing device can be provided only to a specific user.

The information processing device does not necessarily need to determine in all situations whether to output the contents data utilizing the internet address as a key. For example, the information processing device may execute the aforementioned determination in a case where the internet address is being stored in the external memory, and may automatically output the contents data to the external memory without executing this determination in a case where the internet address is not being stored in the external memory (or may output the contents data to the external memory utilizing a different method).

Further, for example, a configuration of the information processing device may be adopted in which the user can select whether to execute the aforementioned determination. That is, when the user has selected not to execute the aforementioned determination, the information processing device may automatically output the contents data to the external memory without executing this determination (or may output the contents data to the external memory utilizing a different method). As long as the information processing device is provided with a program capable of executing the aforementioned determination, a novel information processing device can be said to be realized in the present specification.

(First Embodiment)

Figure 1:
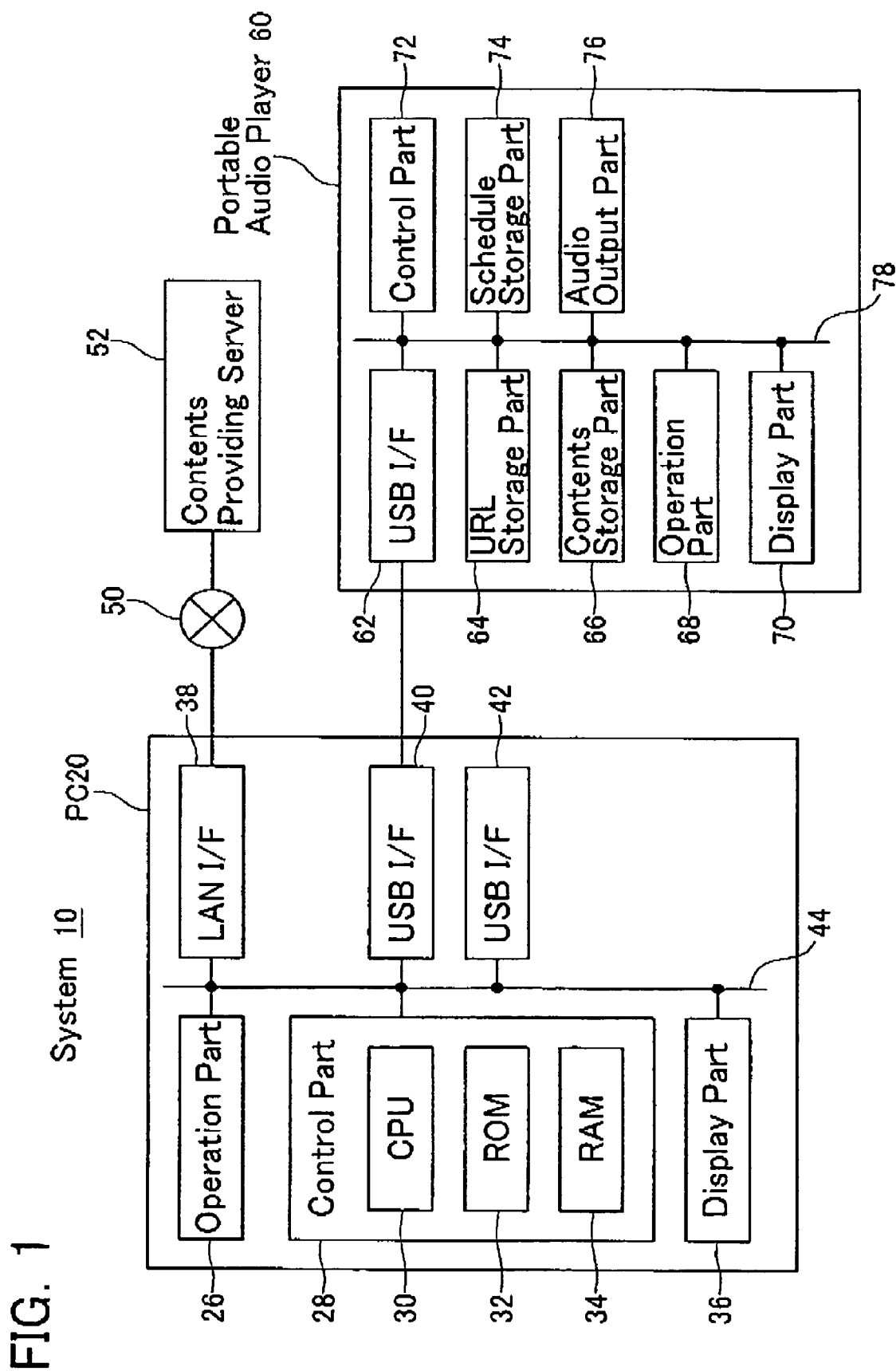
FIG. 1 shows a schematic view of a memory system of a first embodiment.

An embodiment will be described with reference to figures. FIG. 1 shows the configuration of a memory system 10 of the present embodiment. The memory system 10 comprises a PC 20, the internet 50, a contents providing server 52, and a portable audio player 60.

(Configuration of the PC)

The PC 20 comprises an operation part 26, a control part 28, a display part 36, a LAN interface 38, a plurality of USB interfaces 40 and 42, etc The devices 26 to 42 are communicably connected by a bus wire 44. The operation part 26 comprises a keyboard and a mouse. A user can input commands or information to the PC 20 by operating the operation part 26. The control part 28 comprises a CPU 30, a ROM 32, a RAM 34, etc. The CPU 30 performs various processes in accordance with programs stored in the ROM 32, and exerts general control over the operation of the PC 20. The ROM 32 stores various programs. The RAM 34 is capable of temporarily storing data The detailed contents of the data stored by the RAM 34 of the present embodiment will be described later. The display part 36 is capable of displaying information.

The LAN interface 38 is connected with the internet 50. The LAN interface 38 is capable of inputting data sent from devices (a server, etc.) on the internet 50. In the present embodiment, the contents providing server 52 is connected with the internet 50. The LAN interface 38 is capable of inputting contents data (audio data and/or image data) output from the contents providing server 52. The USB interface 40 is connected with the portable audio player 60. Below, the portable audio player 60 will be termed simply "player". The USB interface 40 is capable of inputting a URL output from the player 60. Further, the USB interface 40 is capable of outputting contents data to the player 60. I1 the present embodiment, nothing is connected with the USB interface 42. However, a player (the player 60 or another player) can be connected with the USB interface 42. That is, a plurality of players 60 can simultaneously be connected with the PC 20.

FIGS. 2 and 3 show examples of data stored in the RAM 34. As shown in FIG. 2, the RAM 34 is capable of storing a plurality of combinations of a URL 110, a contents format 111, an expire date 112, and a status 113. The URL 110 is an internet address. In FIG. 2, two URLs 110a and 110b are shown. The contents format 111 is the data format of contents data stored in the URN 110. For example, the contents data stored in the URL 110a is MP3 format (BEG Audio Layer-3). Further, for example, the contents data stored in the URL 110b is MDI format (Musical Instrument Digital Interface). The contents format 111 is capable of performing recognition from an extension (for example, ".mp3", ".mid" etc.; these are not shown in FIG. 2 and FIG. 3) included in the URL 110. The expire date 112 is a time when the data 110, 111, 113 (as well as contents data 114, to be described, of FIG. 3) is to be deleted from the RAM 34. The status 113 informs whether downloading of the contents data from the URL 110 has finished. In FIG. 2, "DL Finished" means that the downloading has finished. "DL Unfinished" means that the downloading has not yet been finished. In the example in FIG. 2, the downloading of the contents data of the URL 110a has finished, and the downloading of the contents data of the URL 110b has not yet been fished.

As shown in FIG. 3, the RAM 34 is capable of storing a plurality of combinations of the URL 110, and the contents data 114 that has been downloaded from the URL 110. In the example of FIG. 3, the contents data 114 combined with the URL 110a is being stored, and the contents data 114 combined with the URL 110b is not being stored. This is because, as shown in FIG. 2, the contents data of the URL 110b has not yet been downloaded. The RAM 34 is capable of simultaneously storing a plurality of items of contents data 114. For example, the RAM 34 is capable of simultaneously storing the contents data 114 of the URL 110a and the contents data of the URL 110b. Moreover, one item of contents data downloaded from one URL 110 will be termed "one contents data". The manner in which the data in FIGS. 2 and 3 are stored in the RAM 34 will be described in detail later.

(Configuration of the Contents Providing Server)

The contents providing server 52 shown in FIG. 1 is connected with the internet 50. The contents providing server 52 stores contents data (audio data and/or image data). The contents providing server 52 stores the contents data corresponding to the URLs. For example, the contents providing server 52 stores audio data of a tune corresponding to a first URL, and stores audio data for English conversation study corresponding to a second URL. The PC 20 is capable of accessing the contents providing server 52 and downloading the contents data stored by the contents providing server 52. Further, although only one contents providing server 52 has been shown in the present embodiment, a plurality of contents providing servers may be present.

(Configuration of the Player)

The player 60 comprises a USB interface 62, a URL storage part 64, a contents storage part 66, an operation part 68, a display part 70, a control part 72, a schedule storage part 74, and an audio output part 76. The devices 62 to 76 are communicably connected by a bus wire 78. The USB interface 62 is connected with the PC 20. The USB interface 62 is capable of outputting a URL stored in the URL storage part 64 or the schedule storage part 74 (to be described) to the PC 20. Further, the USB interface 62 is capable of inputting contents data output from the PC 20.

The URL storage part 64 is capable of storing a URL. FIG. 4 shows an example of a URL stored by the URL storage part 64. The URL storage part 64 is capable of storing a plurality of URLs 110. In the example of FIG. 4, the URL 110a and a URL 110c are being stored. The user can cause a URL to be stored in the URL storage part 64 by operating the operation part 68 (to be described). Further, the user can cause a URL to be stored in the URL storage part 64 by utilizing the PC 20. That is, the user can input a URL to the PC 20 by operating the operation part 26, and this URL can be transmitted to the player 60. The user can cause a URL 110 storing desired contents data to be stored in the URL storage part 64.

The contents storage part 66 is capable of storing the contents data that was output from the PC 20 and input to the USB interface 62. The contents storage part 66 is capable of storing a plurality of items of contents data. For example, a plurality of tracks of audio data can be stored. Further, a plurality of chapters of image data can be stored.

The operation part 68 comprises a plurality of keys. The user can input commands or information to the player 60 by operating the operation part 68. The display part 70 is capable of displaying information. The display part 70 is capable of displaying the image data stored by the contents storage part 66. The control part 72 exerts general control over the devices 64, 66, 70, 74, 76, etc. mounted on the player 60.

The schedule storage part 74 is capable of storing a schedule input by the user. FIG. 5 shows an example of stored contents of the schedule storage part 74. The schedule storage part 74 is capable of storing a plurality of combinations of a date 116 and a memo 117. The user can input the date 116 and the memo 117 by operating the operation part 68. In the example of FIG. 5, the schedule storage part 74 is storing the fact that the contents data of the URL 110b is to be downloaded on Jan. 19, 2007. The user can cause the URL 110 storing desired contents data to be stored in the schedule storage part 74. As described above, the user can also cause the URL 110 to be stored in the URL storage part 64 The user can cause the URL 110 to be stored in either the URL storage part 64 or the schedule storage part 74, or in both, Moreover, the manner in which the data in the examples of FIG. 4 and 5 is utilized will be described in detail later.

The audio output part 76 is capable of outputting as music the audio data stored by the contents storage part 66. The user can hear the music output from the audio output part 76.

(Processes Executed by the PC)

The configuration of the memory system 10 has been described. Next, the contents of the processes executed by the PC 20 will be described in detail. FIG. 6 to FIG. 9 show flow charts of processes executed by the PC 20. First, the contents of a main process executed by the PC 20 will be described with reference to FIG. 6. The main process is executed while the player 60 is connected with the PC 20.

First, the PC 20 requests the player 60 to output the URLs 110. As a result, the player 60 outputs all the URLs 110 being stored in the URL storage part 64 (see FIG. 4) to the PC 20, and outputs all the URLs 110 being stored in the schedule storage part 74 (see FIG. 5) to the PC 20. The PC 20 can thus obtain the URLs 110 from the player 60 (S2).

The PC 20 reads one URL 110 obtained in S2 (S4). The PC 20 executes the process from S6 onward for the URL 110 read in S4. In S6, the PC 20 determines whether the URL. 110 read in S4 is the same as the URL 110 stored in the RAM 34. In the case where S6 is YES, the process proceeds to S8 In the case where S6 is NO, the process proceeds to S14.

In S8, the PC 20 checks the status 113 (see FIG. 2) combined with the URL 110 read in S4. In the case where the status 113 is "DL Finished", the process proceeds to S10. For example, in the case where the URL 110 read in S4 is the URL 110a of FIG. 2, the process proceeds to S10. In the case where the status 113 is "DL Unfinished", the process from S10 onward is skipped, and the process proceeds to S20. For example, in the case where the URL 110 read in S4 is the URL 110b of FIG. 2, the process proceeds to S20.

In S10, the PC 20 checks the contents format 111 (see FIG. 2) combined with the URL 110 read in S4. For example, in the case where the URL 110 read in S4 is the URL 110a of FIG. 2, the PC 20 specifies that the contents format 111 is MP3 format. When executing S2, the PC 20 obtains from the player 60 a contents format that the player 60 can reproduce. The PC 20 determines whether the contents format 111 and the contents format that the player 60 can reproduce are the same. In the case where they are not the same, the PC 20 converts the contents format 111 of the contents data 114 (see FIG. 3) combined with the URL 110 read in S4 into a contents format that the player 60 can reproduce.

Next, the PC 20 outputs the contents data 114 combined with the URL 110 read in S4 to the player 60 (S12). In the case where the contents format was converted in S10, the converted contents data 114 is output. The contents data 114 output in the process of S12 is input to the player 60. The player 60 stores the contents data 114 in the contents storage part 66. When S12 ends, the process proceeds to S20.

In S14 that is executed in the case where NO was determined in S6, the PC 20 stores the URL 110 read in S4 in the RAM 34 That is, the PC 20 adds the URL 110 read in S4 into the stored contents shown in FIG. 2. Moreover, the PC 20 sets the status 113 of the URL 110 added by the process of S14 as "DL Unfinished". The URL 110 is stored in the RAM 34 of the PC 20 by executing the process of S14. Moreover, the user may equally well input the URL 110 to the PC 20 by operating the operation part 26. In this case, the URL 110 input to the PC 20 by the user is stored in the RAM 34. Further, the RAM 34 of the PC 20 may equally well store a URL 110 (and contents data 114) that has been sent from another PC. When the process of S14 ends, the PC 20 executes a process to store an expire date (S16). This expire date storing process will be described next.

Figure 6:
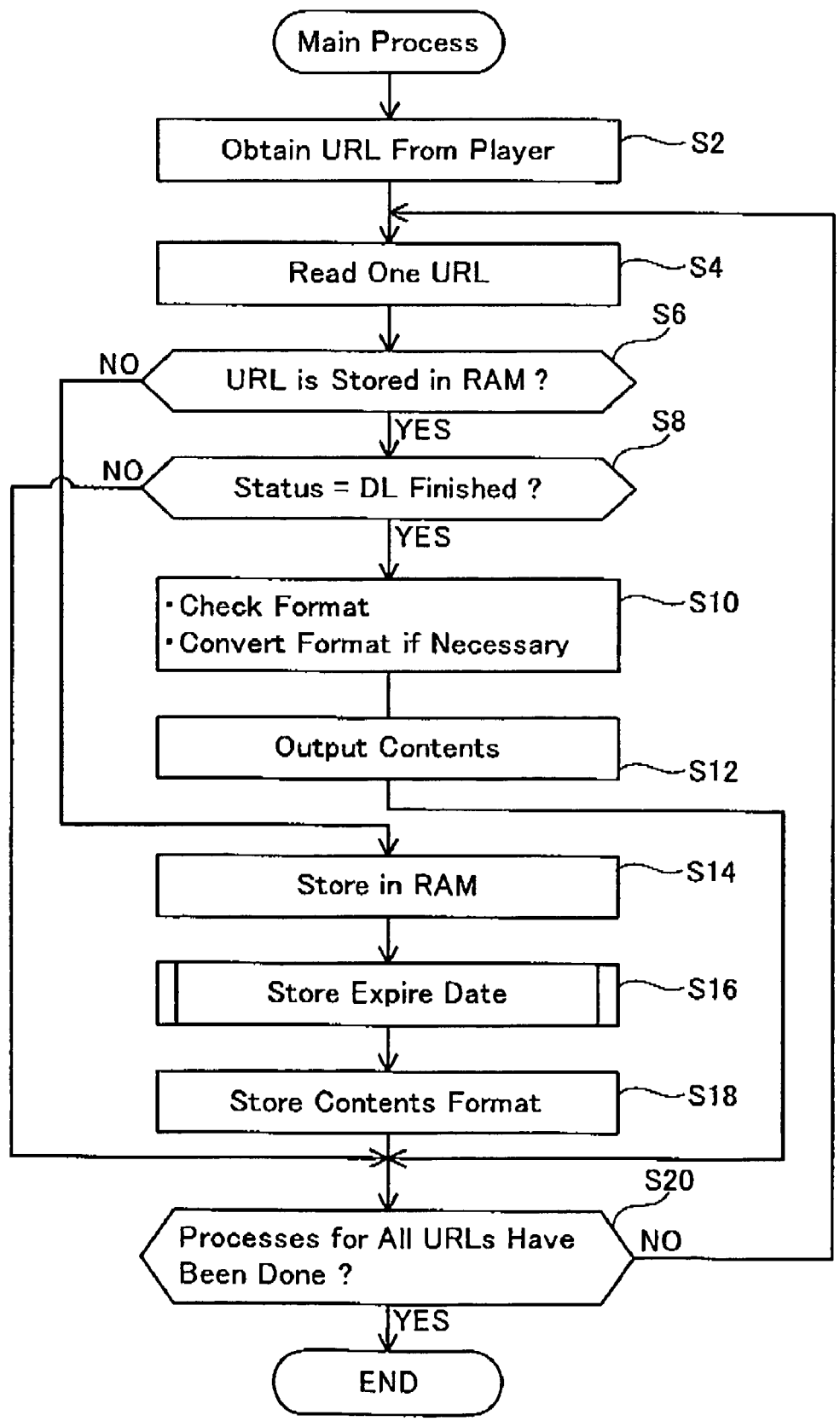
FIG. 6 shows a flow chart of a main process.
Figure 7:
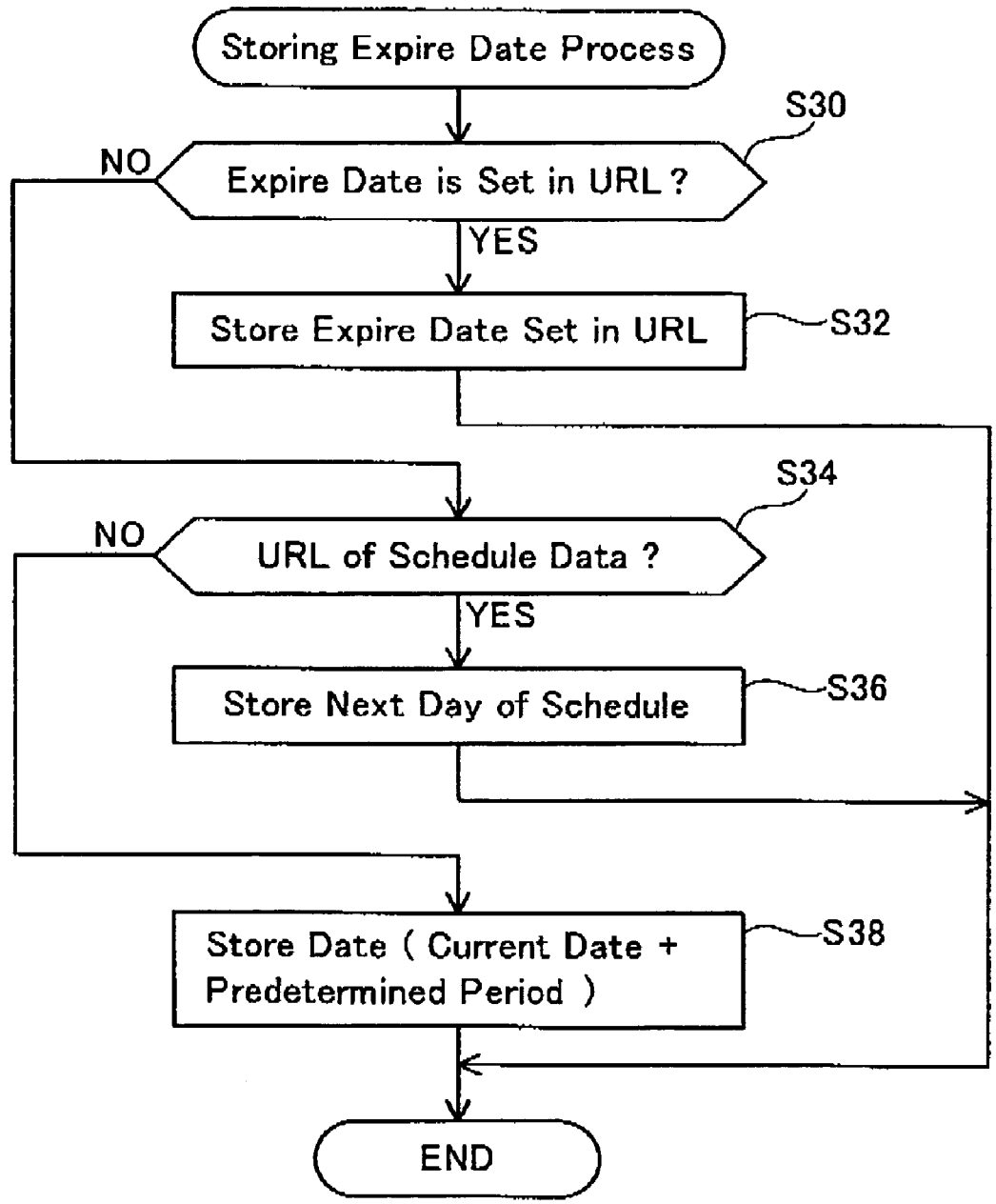
FIG. 7 shows a flow chart of an expire date storing process.

FIG. 7 shows a flow chart of the expire date storing process of S16 of FIG. 6. The PC 20 determines (S30) whether an expire date has been set for the URL 110 stored in the RAM 34 in S14 (the URL 110 read in S4). The user can set the expire date when storing the URL I IO in the URL storage part 64 of the player 60. For example, the expire date (Jan. 30, 2007) has been set for the URL 110a of FIG. 4. Alternatively, the user can store the URL 110 in the URL storage part 64 without setting the expire date. For example, an expire date has not been set for the URL 110c of FIG. 4. In the case where an expire date has been set for the URL 110 stored in the RAM 34 in S14 (in the case where 830 is YES), the PC 20 stores this expire date in the RAM 34 such that this expire date is combined with this URL 110 (S32). For example, in the case where the URL 110 stored in the RAM 34 is the URL 110a of FIG. 4, the PC 20 stores the expire date "Jan. 30, 2007" in the RAM 34 such that this expire date is combined with the URL 110a When S32 ends, the expire date storing process ends.

In the case where an expire date has not been set for the URL 110 stored in the RAM 34 in S14 (in the case where S30 is NO), the process proceeds to S34. In S34, the PC 20 determines whether the URL 110 stored in the RAM 34 in S14 is an URL having been stored in the schedule storage part 74. In the case where S34 is YES, the PC 20 stores the day after the schedule date 116 (see FIG. 5) as the expire date (S36). For example, in the case where the URL 110 stored in the RAM 34 in S14 is the URL 110b of FIG. 5, the PC 20 stores the expire date "Jan. 20, 2007" in the RAM 34 such that this expire date is combined with the URL 110b. When S36 ends, the expire date storing process ends.

In the case where S34 is NO, the process proceeds to S38. In S38, the PC 20 stores as the expire date a date that was obtained by adding a predetermined period, which has been set in advance, to the current date. When S38 ends, the expire date storing process ends.

When the expire date storing process ends, the PC 20 proceeds to S18 of FIG. 6. In S18, the PC 20 stores a contents format such that this contents format is combined with the URL 110 stored in the RAM 34 in S114. The contents format is obtained from an extension of the URL 110. The PC 20 specifies the contents format from an extension of the URL 110. When S18 ends, the PC 20 proceeds to S20.

In S20, the PC 20 determines whether the process from S4 onward has been executed for all the URLs obtained in S2. In the case where S20 is NO, the PC 20 returns to S4 and reads the next URL 110. In the case where S20 is YES, the PC 20 ends the main process. Moreover, in the main process of the present embodiment, the process from S6 onward is executed for one URL 110 that was read in S4. However, the process from S6 onward may be executed in parallel (simultaneously) for a plurality of URLs 110 obtained in S2.

Next, the contents of a download process executed by the PC 20 will be described with reference to FIG. 8. This download process is executed at a predetermined interval irrespective of whether the player 60 is connected with the PC 20.

First, the PC 20 reads one URL 110 stored in the RAM 34 (S50). The PC 20 executes the process from S52 onward for the URL 110 read in S50. In S52, the PC 20 determines whether the status 113 (see FIG. 2) of the URL 110 read in S50 is "DL Unfinished" (S52). In the case where S52 is YES, the process proceeds to S54. In the case where S52 is NO, the process from S54 onward is skipped, and the process proceeds to S68.

In S54, the PC 20 downloads the contents data from the URL 110 read in S50. The PC 20 stores the downloaded contents data in the RAM 34 such that this downloaded contents data is combined with the URL 110 read in S50 (see FIG. 3). Next, the PC 20 changes the status 113 combined with the URL 110 read in S50 to "DL Finished" (S56). For example, in the case where the URL 110 read in S50 is the URL 110b of FIG. 2, the PC 20 changes the status 113 combined with the URL 110b to "DL Finished". Next, the PC 20 determines whether the player 60 is connected (S58). In the case where S58 is YES, the process proceeds to S60. In the case where S58 is NO, the process from S60 onward is skipped, and the process proceeds to S68.

In S60, the PC 20 obtains the URLs 110 stored in the URL storage part 64 and the schedule storage part 74 of the player 60 (see FIGS. 4 and 5). This process is the same as the process of S2 of FIG. 6. Next, the PC 20 determines whether the URL 110 read in S50 is present among the URLs 110 obtained in S60 (S62). In the case where S62 is YES, the process proceeds to S64. In the case where S62 is NO, S64 and S66 are skipped and the process proceeds to S68.

In S64, the PC 20 checks the contents format 111 (see FIG. 2) combined with the URL 110 read in S50 and, if necessary, converts the contents format This process is the same as the process of S10 of FIG. 6. Next, the PC 20 outputs the contents data 114 (see FIG. 3) combined with the URL 110 read in S50 to the player 60 (S66). This process is the same as the process of S12 of FIG. 6. When the process of S66 ends, the PC 20 proceeds to S68.

In S68, the PC 20 determines whether the process from S52 onward has been executed for all the URLs 110 stored in the RAM 34. In the case where S68 is NO, the PC 20 returns to S50 and reads the next URL 110. In the case where S68 is YES, the download process ends. Moreover, in the download process of the present embodiment, the process from S52 onward is executed for one URL 10 that was read in S50. However, a plurality of URLs 110 may be read simultaneously in S50, and the process from S52 onward may be executed in parallel (simultaneously) for these URLs 110.

Figure 9:
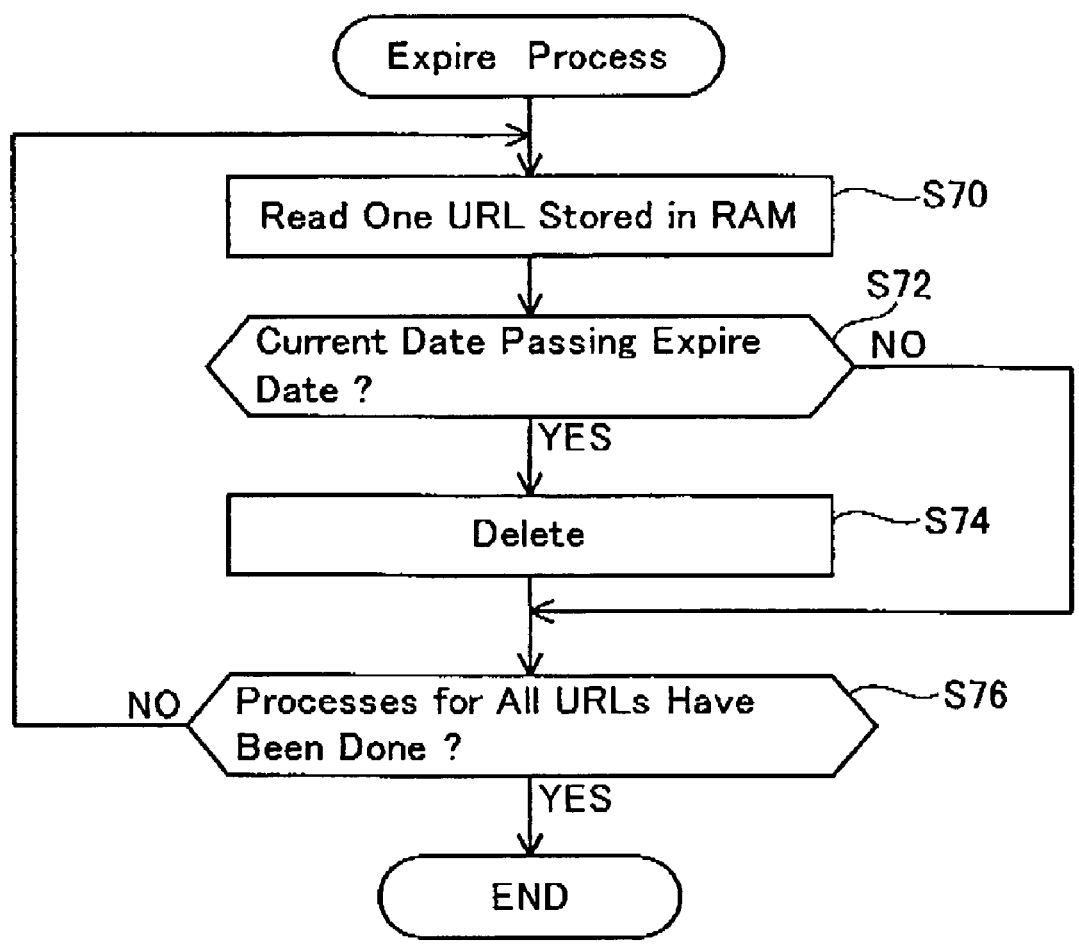
FIG. 9 shows a flow chart of an expire process.

Next, the contents of an expire process executed by the PC 20 will be described with reference to FIG. 9. This expire process is executed at a predetermined interval while the player 60 is not connected with the PC 20.

First, the PC 20 reads one URL 110 stored in the RAM 34 (S70). The PC 20 executes the process from S72 onward for the URL 110 read in S70. In S72, the PC 20 compares the current date and the expire date 112 (see FIG. 2) combined with the URL 110 read in S70. In the case where the expire date 112 has passed the current date (the case where S72 is YES), the PC 20 deletes the URL 110 read in S70 and the data 111, 112, 113, and 114 combined with this URL 110 from the RAM 34 (S74). In the case where the expire date 112 has not passed the current date (the case where S72 is NO), S74 is skipped, and the process proceeds to S76.

In S76, the PC 20 determines whether the process from S72 onward has been executed for all the URLs stored in the RAM 34. In the case where S76 is NO, the PC 20 returns to S70 and reads the next URL 110. In the case where S76 is YES, the expire process ends. Moreover, in the expire process of the present embodiment, the process from S72 onward is executed for one URL 110 that was read in S70. However, a plurality of URLs 110 may be read simultaneously in S70, and the process from S72 onward may be executed in parallel (simultaneously) for these URLs 110.

The memory system 10 of the first embodiment has been described above in detail. The user of the player 60 can cause the URL 110 storing the desired contents data 114 to be stored in the player 60. The PC 20 obtains the URL 110 being stored in the player 60, and outputs the contents data 114 combined with this URL 110 to the player 60. Contents data 114 that is combined with the URL 110 not being stored in the player 60 is not output to the player 60 by the PC 20. As a result, the user can cause only the desired contents data 114 to be stored in the player 60.

The aforementioned effect can also be obtained using the configuration below. That is, the user of the player 60 can cause a combination of the ID of the player 60 and desired contents data 114 to be stored in the PC 20. The PC 20 obtains the ID of the player 60 that is connected thereto, and outputs the contents data 114 combined with this ID to the player 60. In this case, as well, the user can cause only the desired contents data 114 to be stored in the player 60. With is configuration, the PC 20 must monitor the ID of the player 60 that is connected thereto. However, with the configuration of the present embodiment, it is not necessary to monitor the ID of the player 60 because the contents data is transmitted using as a key the URL 110 that is being stored in the player 60. Moreover, the technique taught in the present specification does not exclude this configuration. The technique taught in the present specification may adopt this configuration.

Furthermore, in the case where a plurality of the players 60 are simultaneously connected to the PC 20, the PC 20 can transmit the contents data 114 to each of the players 60 using as a key the URL 110 that is being stored in each of the players 60. The PC 20 does not need to monitor the ID of the players 60 even in the case where a plurality of the players 60 is simultaneously connected to the PC 20.

Further, there is a possibility that, for example, a plurality of the players 60 is storing the same URL 110 (termed predetermined URL 110 below). The PC 20 downloads the contents data (termed predetermined contents data below), and continuously stores the predetermined contents data until the expire date 112. When a first player 60 storing the predetermined URL 110 is connected with the PC 20, the predetermined contents data is output to the first player 60. Further, the predetermined contents data is output to a second player 60 if the second player 60 storing the predetermined URL 110 is connected with the PC 20 by the expire date 112 of the predetermined contents data. The PC 20 can store the predetermined contents data in the plurality of players 60 without downloading the predetermined contents data a plurality of times. An efficient system 10 can be said to have been constructed.

Figure 8:
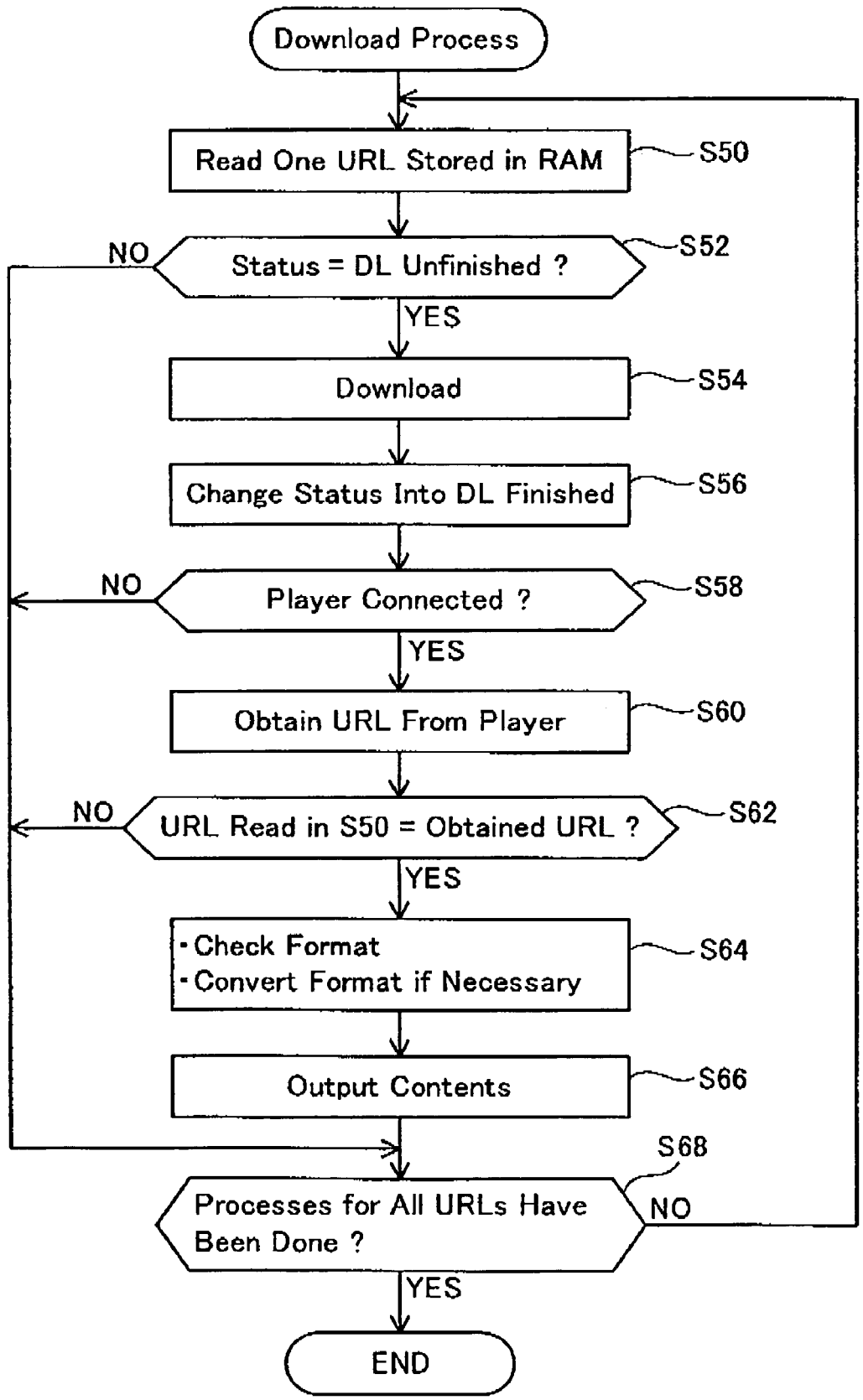
FIG. 8 shows a flow chart of a download process.

In the present embodiment, the download process of FIG. 8 may be executed following the main process of FIG. 6. In this case, the PC 20 may obtain the URL 110 from the player 60 (S2 of FIG. 6), and download the contents data 114 from this URL 110 (S54 of FIG. 8). Before outputting the downloaded contents data 114 to the player 60, the PC 20 again obtains the URL 110 from the player 60 (S60 of FIG. 8), and determines whether to output the contents data 114 to the player 60 using the URL 110 that was obtained again as a key (S62 of FIG. 8). As a result, even if the player 60 is removed from the PC 20 and another player 60 is connected to the PC 20 while the contents data 114 is being downloaded, that contents data 114 is not output to the latter player 60 unless it is required by this latter player 60. It is thus possible to store only the contents data 114 that is required in the player 60.

Further, as an example of another view, it is possible to prevent the contents data desired by the user of the former player 60 from being leaked to the user of the latter player 60. That is, the internet address that is being stored in the player 60 can be utilized as an authentication key to authenticate whether the external memory (the user) is an external memory suitable for obtaining the contents data of the internet address. Further, in the case where for example the latter player 60 and the former player 60 are storing the same internet address, the contents data can be output to the latter player 60 instead of the former player 60 that has been removed That is, the PC 20 does not waste (delete) the contents data that corresponds to the internet address obtained by the former player 60, and is capable of outputting this contents data to the latter player 60. Since it is not necessary to download the same contents data a plurality of times, it is possible to efficiently obtain and download the contents data Moreover, the PC 20 is capable of obtaining the internet address again at various timings. For example, the PC 20 may obtain the internet address again while downloading the contents data Further, the PC 20 may obtain the internet address again on the condition that downloading of the contents data has been completed. Further, the PC 20 may obtain the internet address again on the condition that a combination of the internet address and the contents data downloaded from that internet address has been stored.

(Second Embodiment)

Figure 10:
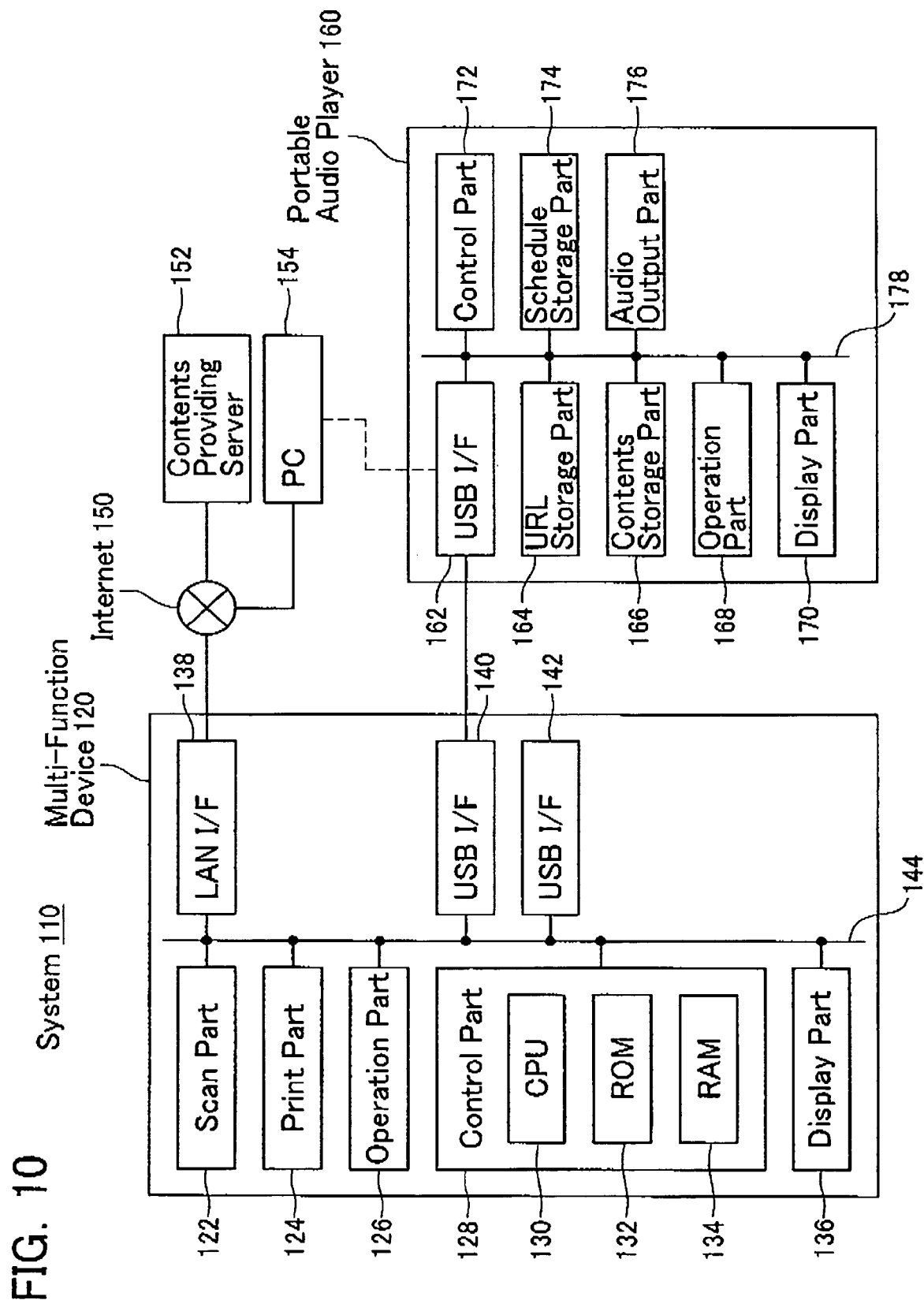
FIG. 10 shows a schematic view of a memory system of a second embodiment.

A second embodiment will now be described. FIG. 10 shows a memory system 110 of the present embodiment. The memory system 110 comprises a multi function device 120, the internet 150, a contents providing server 152, a PC 154, and a portable audio player 160.

(Configuration of the Multi Function Device)

The multi function device 120 comprises a scan part 122, a print part 124, an operation part 126, a control part 128, a display part 136, a LAN interface 138, a plurality of USB interfaces 140 and 142, etc. The devices 122 to 142 are communicably connected by a bus wire 144. The scan part 122 scans a document and creates image data The print part 124 prints the image data. The image data may be sent from the exterior of the multi function device 120 (for example, from the internet 150), or may be created by the scan part 122. The operation part 126 comprises a plurality of keys. The user can input commands or information to the multi function device 120 by operating the operation part 126.

The control part 128 comprises a CPU 130, a ROM 132, a RAM 134, etc. The CPU 130 performs various processes in accordance with programs stored in the ROM 132, and exerts general control over the operation of the multi function device 120. The ROM 132 stores various programs. The RAM 134 is capable of temporarily storing data The RAM 134 of the present embodiment is capable of storing the contents of FIG. 2 of the first embodiment That is, the RAM 134 is capable of storing a plurality of combinations of the URL 110, the contents format 111, the expire date 112, and the status 113. The RAM 134 is capable of storing the URL 110 obtained from the player 160. Further, the user can input the URL 110 to the multi function device 120 by operating the operation part 126, and thus cause the input URL 110 to be stored in the RAM 134. Further, the user can input the URL 110 to the PC 154 by operating the PC 154, transmitting the input URL 110 to the multi function device 120, and thus causing the URL 110 to be stored in the RAM 134. Furthermore, the RAM 134 is capable of storing the contents data 114 (see FIG. 3). The RAM 134 is capable of storing only one item of the contents data 114. That is, the RAM 134 is capable of storing the contents data 114 stored in only one URL 110. In this point, the RAM 134 differs from the RAM 34 of the first embodiment. In the case where the RAM 134 is storing the contents data 114, the multi function device 120 cannot download another item of the contents data 114 unless it deletes the contents data 114 from the RAM 134.

The display part 136 is capable of displaying information, The LAN interface 138 is connected with the internet 150. The contents providing server 152 is connected with the internet 150. Further, the PC 154 is connected with the internet 150. The USB interface 140 is connected with the player 160. In the present embodiment, nothing is connected with the USB interface 142. However, a player (the player 160 or another player) can also be connected with the USB interface 142. That is, a plurality of players 160 can be connected simultaneously with the multi function device 120.

The player 160 has substantially the same configuration as the player 60 of the first embodiment. That is, the player 160 comprises a USB interface 162, a URL storage part 164, a contents storage part 166, an operation part 168, a display part 170, a control part 172, a schedule storage part 174, and an audio output part 176. The devices 162 to 176 are communicably connected by a bus wire 178. The devices 162 to 176 have the same functions as the devices 62 to 76 described in the first embodiment. The USB interface 162 is connected with the multi function device 120. Alternatively, the USB interface 162 can be connected with the PC 154. The user can cause the URL 110 to be stored in the URL storage part 164 or the schedule storage part 174 by operating the PC 154. Further, the user can cause the URL 110 to be stored in the URI storage part 164 or the schedule storage part 174 by operating the operation part 168 of the player 160.

(Processes Executed by the Multi Function Device)

The contents of the processes executed by the multi function device 120 will now be described in detail. FIG. 11 to FIG. 15 show flow charts of processes executed by the multi function device 120. First, the contents of a main process executed by the multi function device 120 will be described with reference to FIG. 11. The main process is executed while the player 160 is connected with the multi function device 120.

First, the multi function device 120 determines whether the URL 110 combined with the "DL Finished" status 113 (see FIG. 2) is being stored in the RAM 134 (S100). In the case where S100 is YES, the multi function device 120 executes a data output process (S102). The contents of the data output process will be described later. In the case where S100 is NO, the multi function device 120 skips S102 and proceeds to S104. The multi function device 120 also proceeds to S104 in the case where the data output process of S102 has ended. In S104, the multi function device 120 executes a URL registration process. The contents of the URL registration process will be described later In the case where the URL registration process of S104 has ended, the multi function device 120 executes a download process (S106). The contents of the download process of S106 will be described later.

The contents of the data output process will be described with reference to FIG. 12. First, the multi function device 120 obtains the URLs 110 being stored in the URL storage part 164 and the schedule storage part 174 of the player 160 (see FIGS. 4 and 5). This process is the same as the process of S2 of FIG. 6 of the first embodiment. Next, the multi function device 120 determines (S122) whether the URL 110 specified in S100 of FIG. 11 (the URL 110 combined with the "DL Finished" status 113 in the RAM 134) is present in the URLs 10 obtained in S120. In the case where S122 is NO, the process proceeds to S124. In S124, the multi function device 120 deletes the contents data 114 being stored in the RAM 134. However, the multi function device 120 does not delete the URL 110, the contents format 111, the expire date 112, and the status 113 combined with the deleted contents data 114 (although the status 113 is changed from "DL Finished" to "DL Unfinished"). When S 124 ends, the data output process ends.

In the case where S122 is YES, the process proceeds to S126. In S126, the multi function device 120 checks the contents format 111 combined with the URL 110 specified in S100 of FIG. 11 and, if necessary, changes the contents format. This process is the same as the process of S10 of FIG. 6 of the first embodiment Next, the multi function device 120 outputs the contents data 114 being stored in the RAM 134 (the contents data 114 combined with the URL 110 specified in S100 of FIG. 11) to the player 160 (S128). This process is the same as the process of S12 of FIG. 6 of the first embodiment When S128 ends, the process proceeds to S130.

Figure 11:
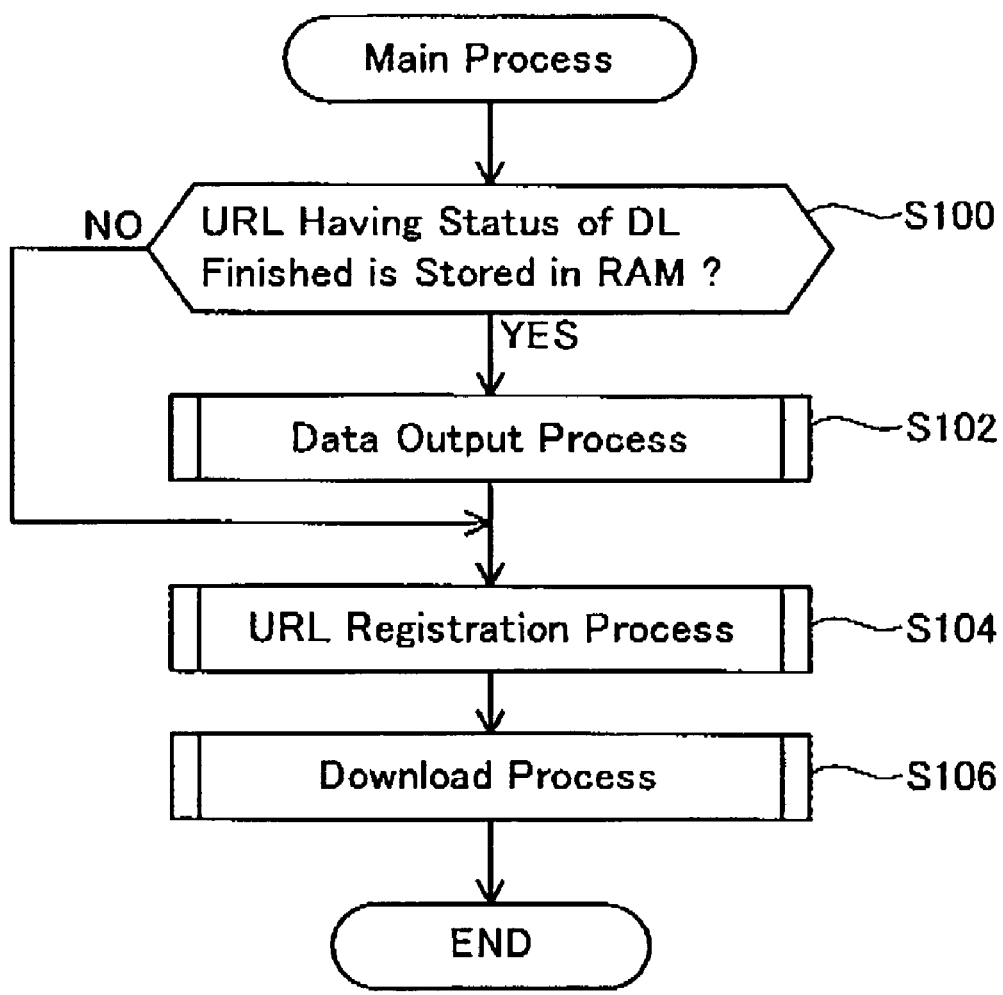
FIG. 11 shows a flow chart of a main process.
Figure 12:
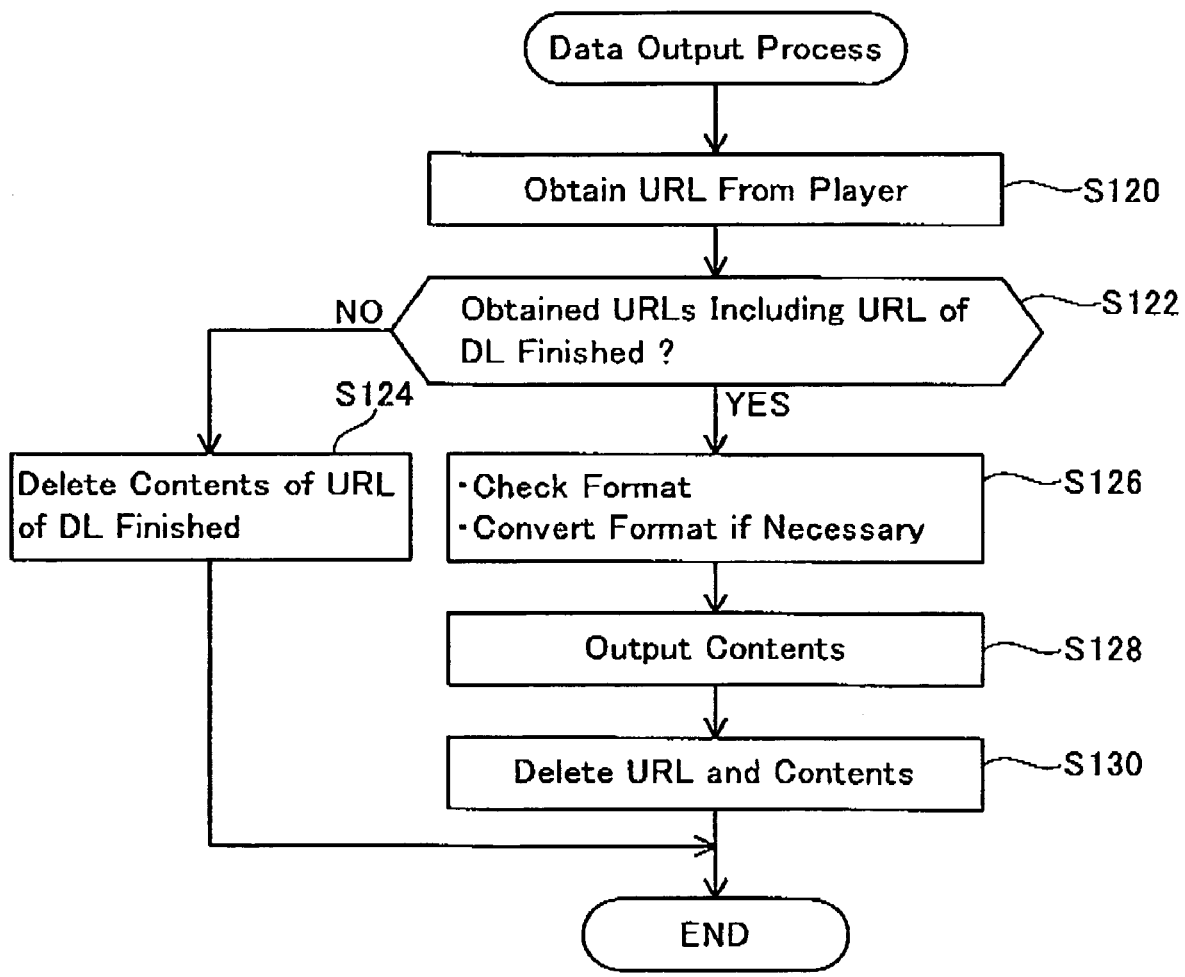
FIG. 12 shows a flow chart of a data output process.

In S130, the multi function device 120 deletes the URL 110 specified in S100 of FIG. 11 and the data 111, 112, 113, and 114 (see FIGS. 2 and 3) combined with this URL 110 from the RAM 134. When S130 ends, the data output process ends.

Figure 13:
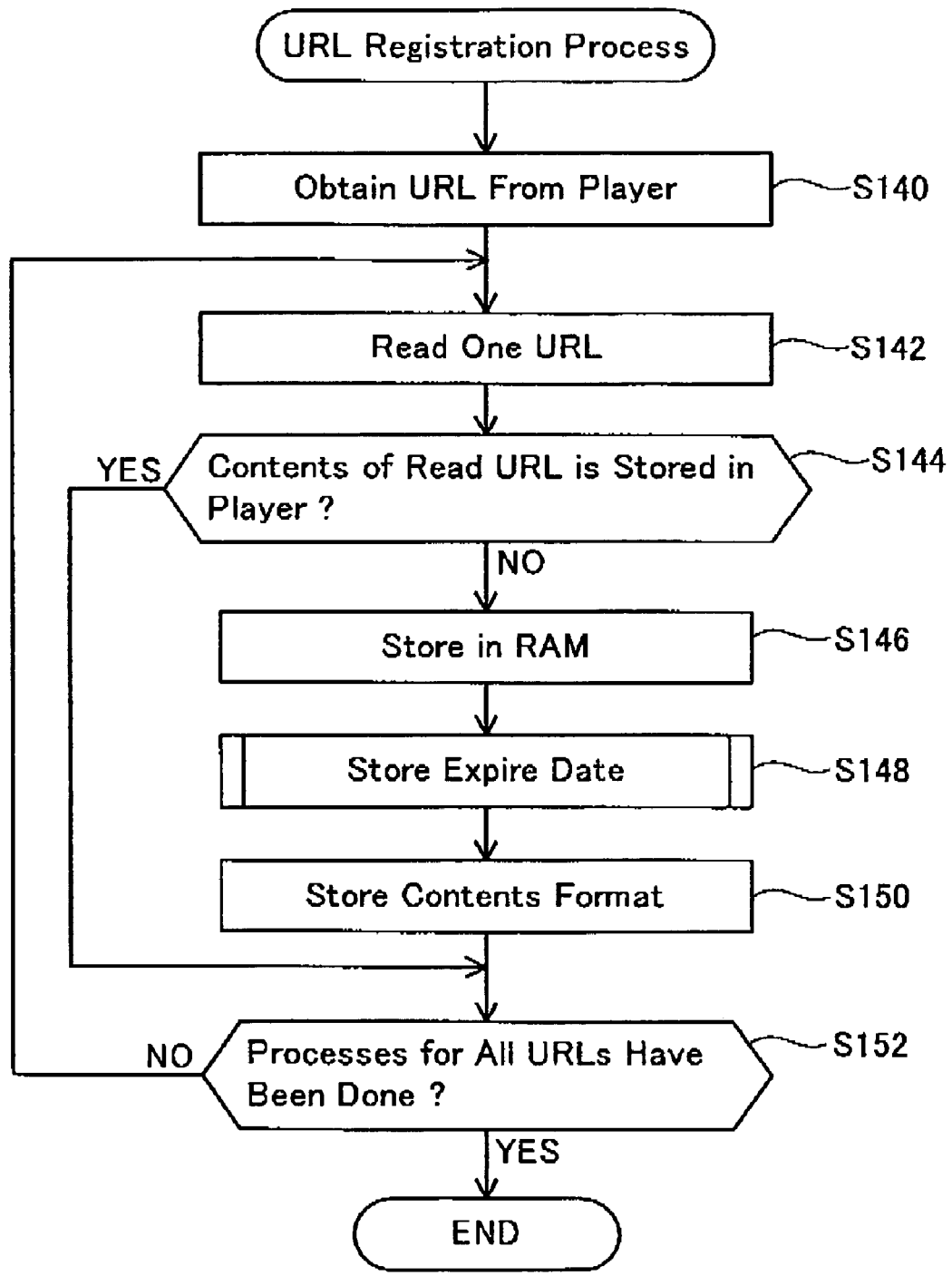
FIG. 13 shows a flow chart of a URL registration process.

Next, the contents of the URL registration process will be described with reference to FIG. 13. First, the multi function device 120 obtains the URLs 110 being stored in the URL storage part 164 and the schedule storage part 174 of the player 160 (see FIGS. 4 and 5). This process is the same as the process of S2 of FIG. 6 of the first embodiment. Next, the multi function device 120 reads one URL obtained in S140 (S142). Next, the multi function device 120 outputs the URL 110 read in S142 to the player 160. The player 160 inputs the URL 110 output from the multi function device 120, and outputs data to the multi function device 120 showing whether the contents data 114 of the input URL 110 is being stored in the contents storage part 166. By referring to this data, the multi function device 120 can determine whether the contents data 114 of the URL 110 read in S142 is being stored in the player 160 (S144). In the case where S144 is YES, the process from S146 onward is skipped, and the process proceeds to S152. In the case where S144 is NO, the process proceeds to S146.

In S146, the multi function device 120 stores the URL 110 read in S142 in the RAM 134. Moreover, the multi function device 120 stores the status 113 "DL Unfinished" such that this status is combined with the URL 110 stored in S146 (the URL 110 read in S142). Next, the multi function device 120 executes a process (S148) to store the expire date 112 (see FIG. 2) and a process (S150) to store the contents format 111 (see FIG. 2) such that this expire date 112 and this contents format are combined with the URL 110 stored in S146 (the URL 110 read in S142). The process of S148 is the same as the expire date storing process of FIG. 7 of the first embodiment. The process of S150 is the same as S18 of FIG. 6 of the first embodiment.

When S150 ends, the process proceeds to S152. In S152, the multi function device 120 determines whether the process from S142 onward has been executed for all the URLs obtained in S140. In the case where S152 is NO, the multi function device 120 returns to S142 and reads the next URL 110. In the case where S152 is YES, the URL registration process ends.

Figure 14:
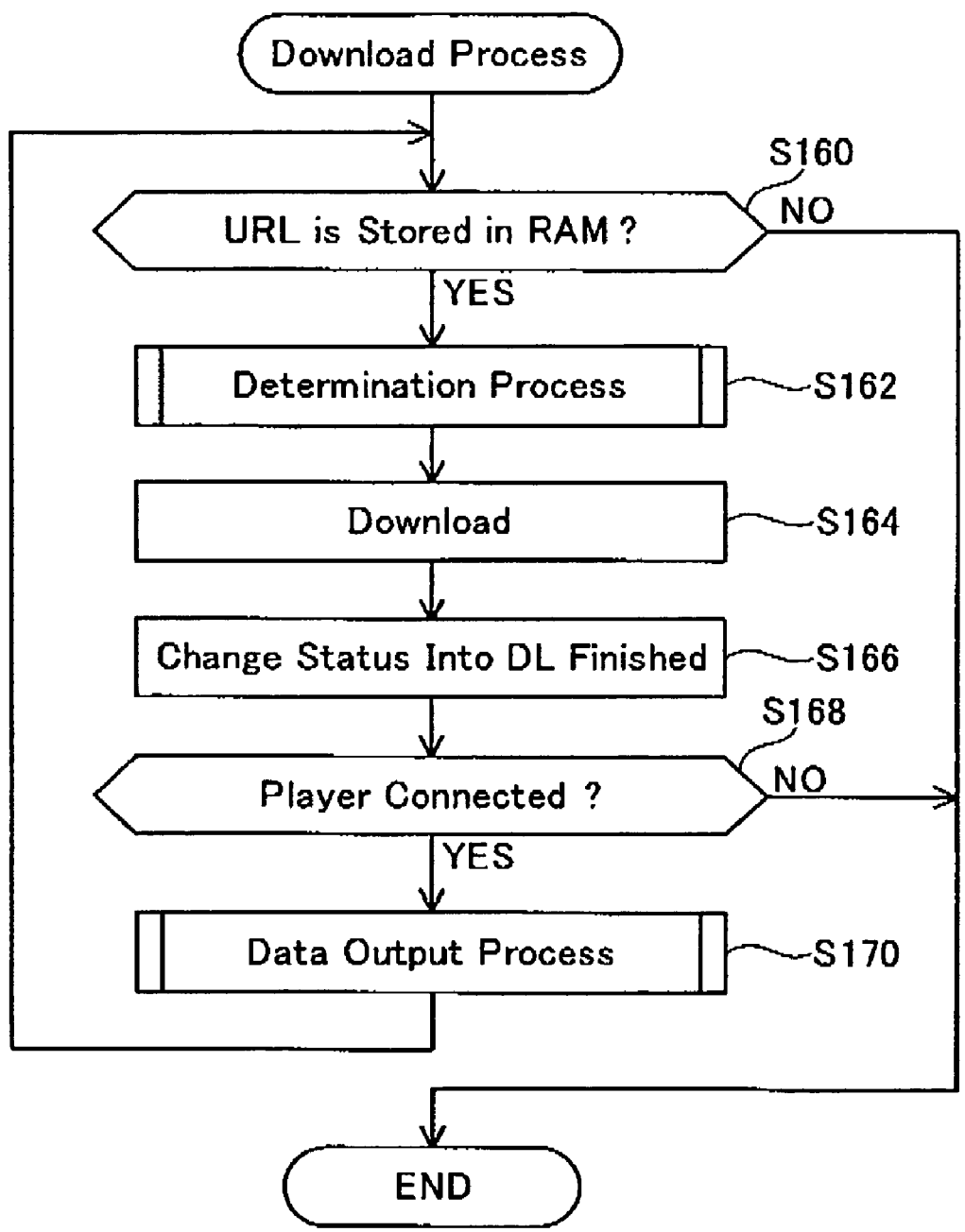
FIG. 14 shows a flow chart of a download process.

Next, the contents of the download process will be described with reference to FIG. 14. The download process is executed in the case where the URL registration process of S104 of FIG. 11 has ended, and is executed at a predetermined interval even if the player 160 is not in a connected state. The multi function device 120 determines whether at least one URL 110 is being stored in the RAM 134 (S160). In the case where S160 is YES, the process proceeds to S162. In the case where S160 is NO, the download process ends.

Figure 15:
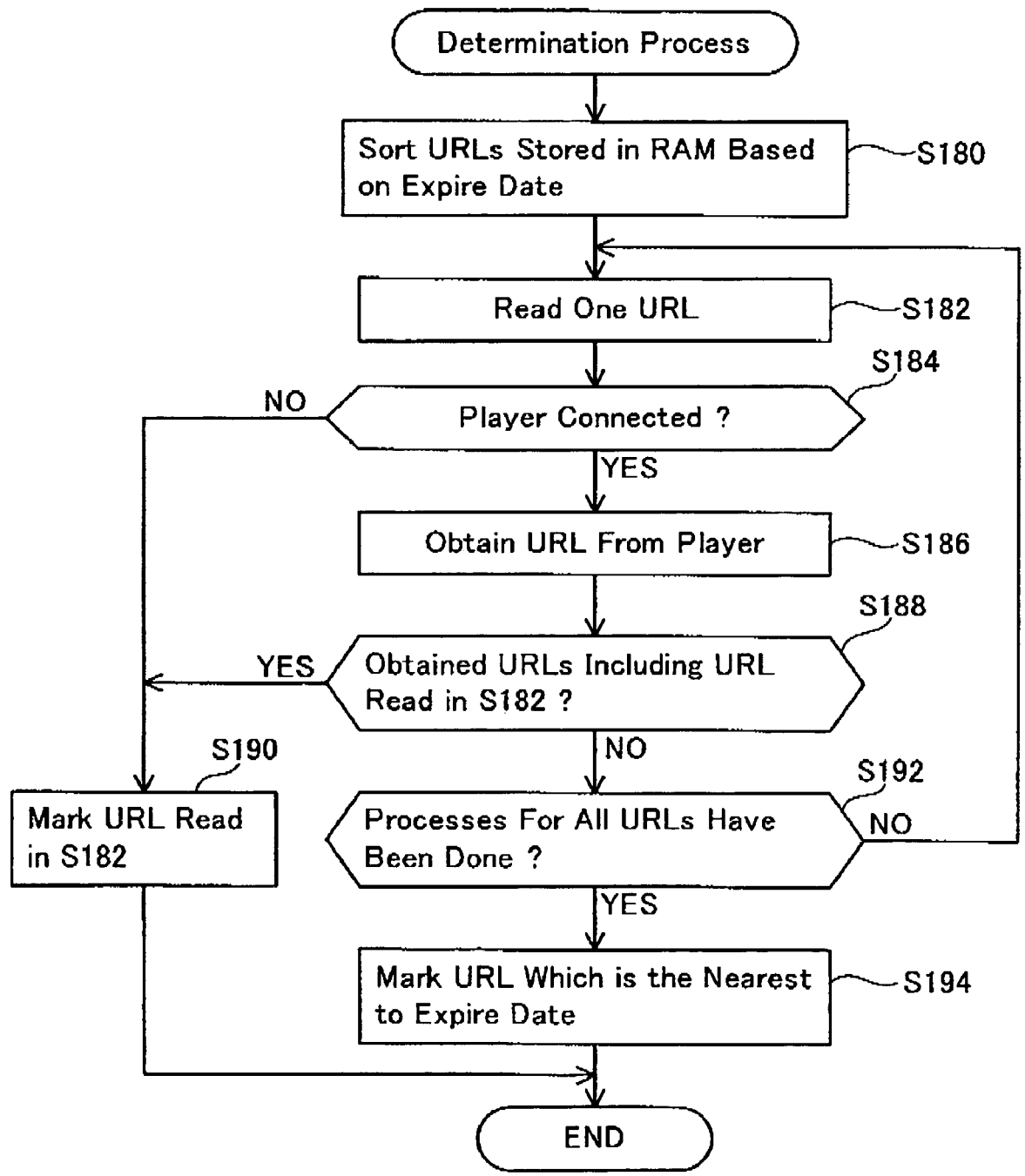
FIG. 15 shows a flow chart of a download URL determination process.

In S162, the multi function device 120 executes a download URL determination process. FIG. 15 shows a flow chart of the download URL determination process. First, the multi function device 120 sorts the URLs 110 being stored in the RAM 134 based on their expire date (S180). Specifically, the URL 110 that has an expire date closest to the current date is set as highest priority. The URL 110 that has an expire date second closest to the current date is set as second highest priority, and the priority of the remaining URLs 110 is set in the same manner. The URL 110 that has an expire date Zest from the current date is set as lowest priority.

Next, the multi function device 120 reads the URL 110 that was sorted into highest priority in S180 (S182). Next, the multi function device 120 determines whether the player 160 is connected (S184). In the case where S184 is YES, the process proceeds to S186. In the case where S184 is NO, the process proceeds to S190. In S186, the multi function device 120 obtains the URLs 110 being stored in the URL storage part 164 and the schedule storage part 174 of the player 160 (see FIGS. 4 and 5). This process is the same as the process of S2 of FIG. 6 of the first embodiment. Next the multi function device 120 determines whether the URL 110 read in S182 is present among the URLs 110 obtained in S186 (S188). In the case where S188 is YES, the process proceeds to S190. In the case where S188 is NO, the process proceeds to S192.

In S190, the multi function device 120 marks the URL 110 read in S182. Specifically, the URL 110 read in S182 is temporarily stored in a predetermined storage area. In S164 of FIG. 14 (to be described), the contents data 114 is downloaded from the URL 110 marked (stored) in S190. When S190 ends, the download URL determination process ends. In S192, the multi function device 120 determines whether the process from S182 onward has been executed for all the URLs 110 being stored in the RAM 134. In the case where S192 is NO, the multi function device 120 returns to S182 and reads the URL 110 that is next in priority. In the case where S192 is YES, the URL 110 sorted as the uppermost in S180 is marked (S194). Specifically, the URL 110 sorted as the highest priority is temporarily stored in the predetermined storage area (see S190). In S164 of FIG. 14 (to be described), the contents data 114 is downloaded from the URL 110 marked (stored) in S194. When S194 ends, the download URL determination process ends.

When the download URL determination process ends, any of the URLs 110 being stored in the RAM 134 has been marked (see S190 or S194). In S164 of FIG. 14, the contents data 114 is downloaded from the URL 110 that was marked by means of the download URL determination process of FIG. 15. The multi function device 120 stores the downloaded contents data 114 in the RAM 134. Next, the multi function device 120 changes the status 113 combined with the URL 110 marked by means of the download URL determination process (the URL 110 wherein the contents data 114 has been downloaded) from "DL Unfinished" to "DL Finished" (S166).

Next, the multi function device 120 determines whether the player 160 is connected (S168). In the case where S168 is YES, the multi function device 120 executes the data output process (S170). This data output process is the same as S102 of FIG. 11 (the flow chart of FIG. 12). When the data output process ends, the process returns to S160. In the case where S168 is NO, the download process ends. Although this is not described in detail, the multi function device 120 of the present embodiment also executes the expire process of FIG. 9 of the first embodiment.

The memory system 110 of the present embodiment has been described in detail. The user of the player 160 can cause a URL 110 storing desired contents data 114 to be stored in the player 160. The multi function device 120 obtains the URL 110 that is being stored in the player 160, and outputs the contents data 114 that is combined with this URL 110 to the player 160. Contents data 114 combined with the URL 110 not being stored in the player 160 is not output to the player 160 by the multi function device 120. It is thus possible to store only the contents data 114 desired by the user in the player 160.

Specific examples are described above in detail, but these examples are merely illustrative. Various changes and modifications to the specific examples described above are possible. For example, the players 60 and 160 may have an operational device, and may execute a process to output the URL 110 in response to a request from the PC 20 or the multi function device 120. Further, instead of utilizing the players 60 and 160 having an operational device, a memory may be utilized that does not have an operational device. In this case, instead of requesting such that the URL 110 is output, the PC 20 or the multi function device 120 may request such that all the data being stored in a specified area of the memory (or in the entirety of the memory) is output, and may determine whether the URL 110 is included within this data.

What is claimed is:

1. An information processing device connectable with an external memory, the information processing device comprising:
a processor;
a storage device that stores a plurality of network addresses obtained from one or more external memories; and
memory storing computer readable instructions that, when executed, cause at least a portion of the information processing device to function as:
a first obtaining device that obtains a first network address stored in a first external memory;
a network communication device that downloads contents data from the first network address in response to determining that the first network address is not being stored in the storage device, wherein the network communication device does not download the contents data from the first network address in response to determining that the first network address is being stored in the storage device;
a second obtaining device configured to obtain a second network address stored in a second external memory after the network communication device starts to download the contents data from the first network address, wherein the second external memory is different from the first external memory;
an authentication device configured to authenticate the second external memory as an authorized recipient of the contents data by determining whether the second network address is identical to the first network address; and
an outputting device configured to automatically output the downloaded contents data to the second external memory in response to determining that the second network address is identical to the first network address,
wherein, in response to determining that the second network address is not identical to the first network address:
the network communication device further downloads contents data from the second network address, and
the outputting device outputs the contents data which has been downloaded from the second network address to the second external memory.

2. The information processing device as in claim 1, wherein the storage device stores, for each of the plurality of network addresses, an association of a network address and specific information indicating that contents data has been downloaded from the network address,
wherein, when the network communication device determines that the first network address is being stored in the storage device:
the network communication device further determines, by referring to the specific information associated with the first network address, whether contents data has been downloaded from the first network address,
the network communication device downloads the contents data from the first network address in a case where the network communication device determines that the contents data has not been downloaded from the first network address, and
the network communication device does not download the contents data from the first network address when the network communication device determines that the contents data has been downloaded from the first network address.

3. The information processing device as in claim 1, wherein the computer readable instructions, when executed, further cause the at least a portion of the information processing device to function as a data conversion device,
wherein the information processing device further obtains information concerning a data format with which the second external memory is compatible,
wherein the data conversion device is configured to convert a data format of the contents data downloaded from the first network address into the data format with which the second memory is compatible, and
wherein the outputting device outputs the converted contents data to the second memory.

4. The information processing device as in claim 1, wherein the computer readable instructions, when executed, further cause the at least a portion of the information processing device to function as a deletion device,
wherein the storage device stores, for each of the plurality of network addresses, an association of a network address, contents data downloaded from the network address, and a date, and wherein the deletion device is configured to delete the association including the date when a current date is past the date specified in the association.

5. The information processing device as in claim 4, wherein when the first network address is associated with a first type of date, the storage device stores an association of the first network address, the contents data downloaded from the first network address, and the date associated with the first network address.

6. The information processing device as in claim 5, wherein
the first type of date includes an expiration date of the contents data set in the first external memory.

7. The information processing device as in claim 5, wherein when the first network address is associated with a second type of date, the storage device stores an association of the first network address, the contents data downloaded from the first network address, and date determined by adding a predetermined time period to the date associated with the first network address.

8. The information processing device as in claim 7, wherein the second type of date corresponds to a date on which downloading from the information processing device is to be performed.

9. The information processing device as in claim 4, wherein
when the first network address is not associated with a date, the storage device stores an association of the first network address, the contents data downloaded from the first network address, and a date determined by adding a predetermined time period to the current date.

10. A non-transitory computer readable medium storing a computer program for an information processing device connectable to external memory, the computer program including instructions that, when executed, cause the information processing device to perform:
storing a plurality of network addresses in a storage device, the plurality of network addresses obtained from one or more external memories;
obtaining a first network address stored in a first external memory;
downloading contents data from the first network address in response to determining that the first network address is not being stored in the storage device, wherein the downloading is not performed in response to determining that the first network address is being stored in the storage device;
obtaining a second network address stored in a second external memory after beginning downloading of the contents data from the first network address, wherein the second external memory is different from the first external memory;
authenticating the second external memory as an authorized recipient of the contents data by determining whether the second network address obtained after beginning downloading of the contents data is identical to the first network address;
automatically outputting the contents data downloaded from the first network address to the second external memory in response to determining that the second network address is identical to the first network address;
in response to determining that the second network address is not identical to the first network address:
downloading contents data from the second network address; and
outputting the contents data downloaded from the second network address to the second external memory.

11. A method comprising:
storing a plurality of network addresses in a storage device, the plurality of network addresses obtained from one or more external memories;
obtaining a first network address stored in a first external memory;
downloading, by a computing device, contents data from the first network address in response to determining that the first network address is not being stored in the storage device, wherein the downloading is not performed in response to determining that the first network address is being stored in the storage device;
obtaining a second network address stored in a second external memory after beginning downloading of the contents data from the first network address, wherein the second external memory is different from the first external memory;
authenticating, by the computing device, the second external memory as an authorized recipient of the contents data by determining whether the second network address obtained after beginning downloading of the contents data is identical to the first network address;
automatically outputting, by the computing device, the contents data downloaded from the first network address to the second external memory in response to determining that the second network address is identical to the first network address;
in response to determining that the second network address is not identical to the first network address:
downloading contents data from the second network address; and
outputting the contents data downloaded from the second network address to the second external memory.

* * * * *